US009725021B2

(12) United States Patent
Fujita et al.

(10) Patent No.: US 9,725,021 B2
(45) Date of Patent: Aug. 8, 2017

(54) VEHICLE SEAT, AND SEAT FRAME FOR VEHICLE SEAT (75) Inventors: Satoshi Fujita, Tochigi (JP); Hiroyuki Itoi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/425,179

(22) PCT Filed: Sep. 3, 2012

(86) PCT No.: PCT/JP2012/072389
§ 371 (c)(1),
(2), (4) Date: Mar. 2, 2015

(87) PCT Pub. No.: WO2014/033964
PCT Pub. Date: Mar. 6, 2014

(65) Prior Publication Data
US 2015/0210195 A1    Jul. 30, 2015

(51) Int. Cl.
*A47C 7/02* (2006.01)
*B60N 2/68* (2006.01)
(Continued)

(52) U.S. Cl.
CPC ............. *B60N 2/68* (2013.01); *B60N 2/4228* (2013.01); *B60N 2/42709* (2013.01); *B60N 2/42745* (2013.01)

(58) Field of Classification Search
CPC ...... B60N 2/68; B60N 2/682; B60N 2/42709; B60N 2/4221; B60N 2/4228; B60N 2/42745
(Continued)

(56) References Cited

U.S. PATENT DOCUMENTS 3,802,737 A    4/1974  Mertens
5,464,273 A *  11/1995 Makoto .................. B60N 2/242
                                                        297/232
(Continued)

FOREIGN PATENT DOCUMENTS

DE    44 21 946 A1    6/1995
JP    03-081139 U     8/1991
(Continued)

OTHER PUBLICATIONS

Extended European Search Report issued for EP 12883794.5 (Jul. 31, 2015).
(Continued)

*Primary Examiner* — David R Dunn
*Assistant Examiner* — Alexander Harrison
(74) *Attorney, Agent, or Firm* — Drinker Biddle & Reath LLP (57) ABSTRACT

Provided is a seat frame for a vehicle seat capable of supporting the back of a seated person during a rear-end collision by using a simple structure and few component portions. The seat frame includes a top frame portion on the top of the seat, lateral frame portions on the right and left of the seat, and a connection frame connecting the tops of the lateral frame portions to bridge them. The connection frame includes a bent protrusion portion bent in the longitudinal direction and arranged in a standing condition from a surface formed by the connection frame, at a position between a pair of the lateral frame portions. The bent protrusion portion is provided over the entire length of the up and down direction of the connection frame.

9 Claims, 5 Drawing Sheets

(51) Int. Cl.
*B60N 2/42* (2006.01)
*B60N 2/427* (2006.01)

(58) Field of Classification Search
USPC ............... 297/452.18, 452.2, 216.13, 216.1
See application file for complete search history.

(56) References Cited

U.S. PATENT DOCUMENTS

| | | | |
|---|---|---|---|
| 5,509,716 A | | 4/1996 | Kolena et al. |
| 5,685,614 A | * | 11/1997 | Chabanne .............. B60N 2/682 297/452.2 |
| 5,810,446 A | * | 9/1998 | Tadokoro .............. B60N 2/686 297/452.18 |
| 6,048,033 A | * | 4/2000 | Sakurai .................. B60N 2/68 297/361.1 |
| 6,375,267 B1 | * | 4/2002 | Ishikawa ................ B60N 2/22 297/452.18 |
| 6,446,945 B1 | * | 9/2002 | Wisniewski ......... B60N 2/7094 267/105 |
| 8,690,255 B2 | * | 4/2014 | Yamaki ................ B60N 2/4228 297/216.14 |
| 8,822,850 B2 | * | 9/2014 | Endo ..................... B60N 2/002 177/136 |
| 2002/0053819 A1 | * | 5/2002 | Itoh ...................... B60N 2/4808 297/216.13 |
| 2013/0134749 A1 | * | 5/2013 | Awata .................. B60N 2/5825 297/216.13 |
| 2013/0140859 A1 | * | 6/2013 | Yamaki ................ B60N 2/4235 297/216.13 |
| 2014/0049090 A1 | * | 2/2014 | Mori .................... B60N 2/5825 297/452.49 |
| 2014/0070594 A1 | * | 3/2014 | Awata .................. B60N 2/5825 297/452.48 |
| 2014/0084661 A1 | * | 3/2014 | Awata .................. B60N 2/5825 297/452.18 |
| 2014/0225352 A1 | * | 8/2014 | Awata .................. B60R 21/207 280/728.2 |

FOREIGN PATENT DOCUMENTS

| | | |
|---|---|---|
| JP | 2000-118279 A | 4/2000 |
| JP | 3519644 B2 | 4/2004 |
| JP | 2010-046162 A | 3/2010 |
| JP | 2011-102071 A | 5/2011 |
| JP | 2011-105126 A | 6/2011 |
| JP | 2012-071627 A | 4/2012 |

OTHER PUBLICATIONS

Office Action issued for related application JP 2014-532724, Nov. 24, 2015, with partial English translation, 4 pages.

* cited by examiner

VEHICLE SEAT, AND SEAT FRAME FOR VEHICLE SEAT

CROSS REFERENCE TO RELATED APPLICATIONS

This application is a National Stage Entry application of PCT Application No. PCT/JP2012/072389, filed Sep. 3, 2012.

BACKGROUND

Disclosed herein is a vehicle seat, and a seat frame for a vehicle seat.

A conventionally proposed vehicle seat is configured by arranging sub frames that extend in the width direction of the seat on the upper portion and the lower portion to bridge side frames on the right and left of a seat back frame, and attaching an approximate plate-shaped resin plate that supports the back of a seated person to the upper and lower sub frames via a rod (for example, see Japanese Patent Document No. 2011-105126 A ("the '126 Document")).

In the seat back frame of the '126 Document, the resin plate is attached to the upper and lower sub frames via the rod so that the resin plate is pushed backward by the back of the seated person during a rear-end collision of a vehicle, thereby making it capable of supporting the back of the seated person.

However, in the invention of the '126 Document, as a structure for supporting the back of the seated person, the resin plate is attached to the upper and lower sub frames via the rod so that component portions are increased and the structure is complicated.

SUMMARY

Various embodiments of the present invention consider the above problem, and an object herein is to provide a seat frame for a vehicle seat capable of supporting the back of a seated person during a rear-end collision by using a simple structure.

According to a seat frame for a vehicle seat of an embodiment, the above problem is solved by the seat frame having a seat back frame including a top frame portion on the top of the seat, lateral frame portions on the right and left of the seat, and a connection frame connecting the tops of the lateral frame portions to bridge them, in which the connection frame includes a bent protrusion portion bent in the longitudinal direction of the connection frame and arranged in a standing condition from a surface formed by the connection frame, at a position between a pair of the lateral frame portions, and the bent protrusion portion is provided over the entire length of the up and down direction of the connection frame.

In this way, the connection frame includes the bent protrusion portion bent in the longitudinal direction of the connection frame and arranged in a standing condition from the surface formed by the connection frame, at the position between the pair of the lateral frame portions, and the bent protrusion portion is provided over the entire length of the up and down direction of the connection frame so that the bent protrusion portion is extended from a bent state by receiving a load of an occupant, for example, during a rear-end collision of a vehicle, thereby the central portion in the seat width direction of the connection frame can be moved backward, and the occupant can be allowed to enter to a position more rear of the seat than in general use.

Moreover, since the connection frame connects the tops of the lateral frame portions to bridge them, a position near the neck of the occupant back surface can be allowed to enter to the position of the rear of the seat during a rear-end collision of the vehicle or the like, and the distance between the occupant back surface and the head rest can be reduced.

In an embodiment, it is preferable that the bent protrusion portion is provided on the end portion side in the seat width direction of the connection frame, and protrudes to the front of the seat.

In this way, since the bent protrusion portion is provided on the end portion side in the seat width direction of the connection frame, the bent protrusion portion is provided on a position except for a portion where the load of the occupant is received so that sitting comfort of the occupant is not affected, and the bent protrusion portion can be suppressed from directly receiving the load of the occupant in general use. Moreover, since the bent protrusion portion protrudes to the front of the seat, interference between the side frames and the bent protrusion portion can be suppressed when the connection frame is attached or when the bent protrusion portion is extended during a rear-end collision of the vehicle or the like.

In an embodiment, it is preferable that the connection frame is formed from a plate-shaped body, and in the central portion of the seat width direction of the connection frame, a flange portion formed by bending the end portion thereof is provided on at least one of the upper end and the lower end, and that the bent protrusion portion is provided in a region where the flange portion of the connection frame is not provided.

In this way, in the connection frame, since the bent protrusion portion is formed on a region with no flange portion and with rigidity not increased, when the load is applied to the connection frame during a rear-end collision of the vehicle or the like, the load of the occupant is stably received on a portion whose rigidity is increased by the flange portion, while the bent protrusion portion on the portion whose rigidity is not increased can be smoothly extended.

In an embodiment, it is preferable that the region where the flange portion is not provided is formed on the end portion of the seat width direction of the connection frame.

As thus configured, when the load is applied to the connection frame during a rear-end collision of the vehicle or the like, the vicinity of the center where the load of the occupant is mainly received is provided with the flange portion and increased in rigidity and the load of the occupant can be stably received there, and at the same time, the connection frame can be smoothly extended on the end portion to which the load of the occupant is not directly applied.

In an embodiment, it is preferable that the seat back frame includes a pair of side frames extending along right and left sides of the seat, and an upper frame connecting upper ends of the pair of side frames, that the upper frame includes the top frame portion, and upper frame side portions which are formed by extending the end portion of the seat width direction of the top frame portion downwardly while being curved and to which the side frames are fixed, that the connection frame has connection portions fixed to the upper frame side portions on both ends, and a center side end portion of the seat of the connection portion extends backward of the center of the seat, that the side frame includes a side wall extending in the front to back direction of the seat, and a rear wall formed by bending the rear end of the side wall to the center side of the seat, and that in the rear wall, the upper end inside the seat is notched obliquely.

As thus configured, the side frames can be notched in the vicinity of the position where the connection frame is fixed to the upper frame side portions, and interference by the side frames is suppressed when the connection frame is attached, thereby improving attaching workability. Moreover, when the connection frame is extended during a rear-end collision of the vehicle or the like, interference by the side frames can be suppressed and smooth extension of the connection frame is enabled.

In an embodiment, it is preferable that the connection frame includes wide portions with a large length of the up and down direction and narrow portions with a small length of the up and down direction, and that the bent protrusion portion is formed on the narrow portions.

As thus configured, the bent protrusion portion is formed on the narrow portion with relatively low rigidity, and when the load is applied to the connection frame during a rear-end collision of the vehicle or the like, the bent protrusion portion can be smoothly extended.

In an embodiment, it is preferable that openings are drilled in the connection frame, and that the bent protrusion portion is formed in a region where the openings are not provided of the connection frame.

As thus configured, while the weight of the connection frame is reduced by providing the openings, the rigidity of the bent protrusion portion can be maintained by forming the bent protrusion portion on the region where the openings are not provided.

According to a vehicle seat of an embodiment, the above problem is solved by the vehicle seat having a seat back frame including a top frame portion on the top of the seat, lateral frame portions on the right and left of the seat, and a connection frame connecting the tops of the lateral frame portions to bridge them, in which the connection frame includes a bent protrusion portion bent in the longitudinal direction of the connection frame and arranged in a standing condition from a surface formed by the connection frame, at a position between a pair of the lateral frame portions, and the bent protrusion portion is provided over the entire length of the up and down direction of the connection frame.

In this way, the connection frame includes the bent protrusion portion bent in the longitudinal direction of the connection frame and arranged in a standing condition from the surface formed by the connection frame, at the position between the pair of the lateral frame portions, and the bent protrusion portion is provided over the entire length of the up and down direction of the connection frame so that the bent protrusion portion is extended from a bent state by receiving the load of the occupant, for example, during a rear-end collision of the vehicle, thereby the central portion in the seat width direction of the connection frame can be moved backward, and the occupant can be allowed to enter to a position more rear of the seat than in general use.

Moreover, since the connection frame connects the tops of the lateral frame portions to bridge them, a position near the neck of the occupant back surface can be allowed to enter to the position of the rear of the seat during a rear-end collision of the vehicle or the like, and the distance between the occupant back surface and the head rest can be reduced.

According to an embodiment, the connection frame includes the bent protrusion portion bent in the longitudinal direction of the connection frame and arranged in a standing condition from the surface formed by the connection frame, at the position between the pair of the lateral frame portions, and the bent protrusion portion is provided over the entire length of the up and down direction of the connection frame so that the bent protrusion portion is extended from a bent state by receiving a load of an occupant, for example, during a rear-end collision of a vehicle, thereby the central portion in the seat width direction of the connection frame can be moved backward, and the occupant can be allowed to enter to a position more rear of the seat than in general use.

Moreover, since the connection frame connects the tops of the lateral frame portions to bridge them, a position near the neck of the occupant back surface can be allowed to enter to the position of the rear of the seat during a rear-end collision of the vehicle or the like, and the distance between the occupant back surface and the head rest can be reduced.

According to an embodiment, since the bent protrusion portion is provided on the end portion side in the seat width direction of the connection frame, the bent protrusion portion is provided on a position except for a portion where the load of the occupant is received so that sitting comfort of the occupant is not affected, and the bent protrusion portion can be suppressed from directly receiving the load of the occupant in general use. Moreover, since the bent protrusion portion protrudes to the front of the seat, interference between the side frames and the bent protrusion portion can be suppressed when the connection frame is attached or when the bent protrusion portion is extended during a rear-end collision of the vehicle or the like.

According to an embodiment, since the bent protrusion portion is formed on a region with no flange portion and with rigidity not increased of the connection frame, when the load is applied to the connection frame during a rear-end collision of the vehicle or the like, the load of the occupant is stably received on a portion whose rigidity is increased by the flange portion, while the bent protrusion portion on the portion whose rigidity is not increased can be smoothly extended.

According to an embodiment, when the load is applied to the connection frame during a rear-end collision of the vehicle or the like, the vicinity of the center where the load of the occupant is mainly received is provided with the flange portion and increased in rigidity and the load of the occupant can be stably received there, and at the same time, the connection frame can be smoothly extended on the end portion to which the load of the occupant is not directly applied.

According to an embodiment, the side frames can be notched in the vicinity of the position where the connection frame is fixed to the upper frame side portions, and interference by the side frames is suppressed when the connection frame is attached, thereby capable of improving attaching workability. Moreover, when the connection frame is extended during a rear-end collision of the vehicle or the like, interference by the side frames can be suppressed and smooth extension of the connection frame is enabled.

According to an embodiment, the bent protrusion portion is formed on the narrow portion with relatively low rigidity, and when the load is applied to the connection frame during a rear-end collision of the vehicle or the like, the bent protrusion portion can be smoothly extended.

According to an embodiment, while the weight of the connection frame is reduced by providing the openings, the rigidity of the bent protrusion portion can be maintained by forming the bent protrusion portion on the region where the openings are not provided.

According to an embodiment, the connection frame includes the bent protrusion portion bent in the longitudinal direction of the connection frame and arranged in a standing condition from the surface formed by the connection frame, at the position between the pair of the lateral frame portions, and the bent protrusion portion is provided over the entire length of the up and down direction of the connection frame so that the bent protrusion portion is extended from a bent state by receiving a load of an occupant, for example, during a rear-end collision of a vehicle, thereby the central portion in the seat width direction of the connection frame can be moved backward, and the occupant can be allowed to enter to a position of the rear of the seat than in general use.

Moreover, since the connection frame connects the tops of the lateral frame portions to bridge them, a position near the neck of the occupant back surface can be allowed to enter to the position of the rear of the seat during a rear-end collision of the vehicle or the like, and the distance between the occupant back surface and the head rest can be reduced.

DETAILED DESCRIPTION

Hereinafter, a vehicle seat according to one embodiment of the present invention will be described with reference to FIG. 1 to FIG. 5.

Figure 1:
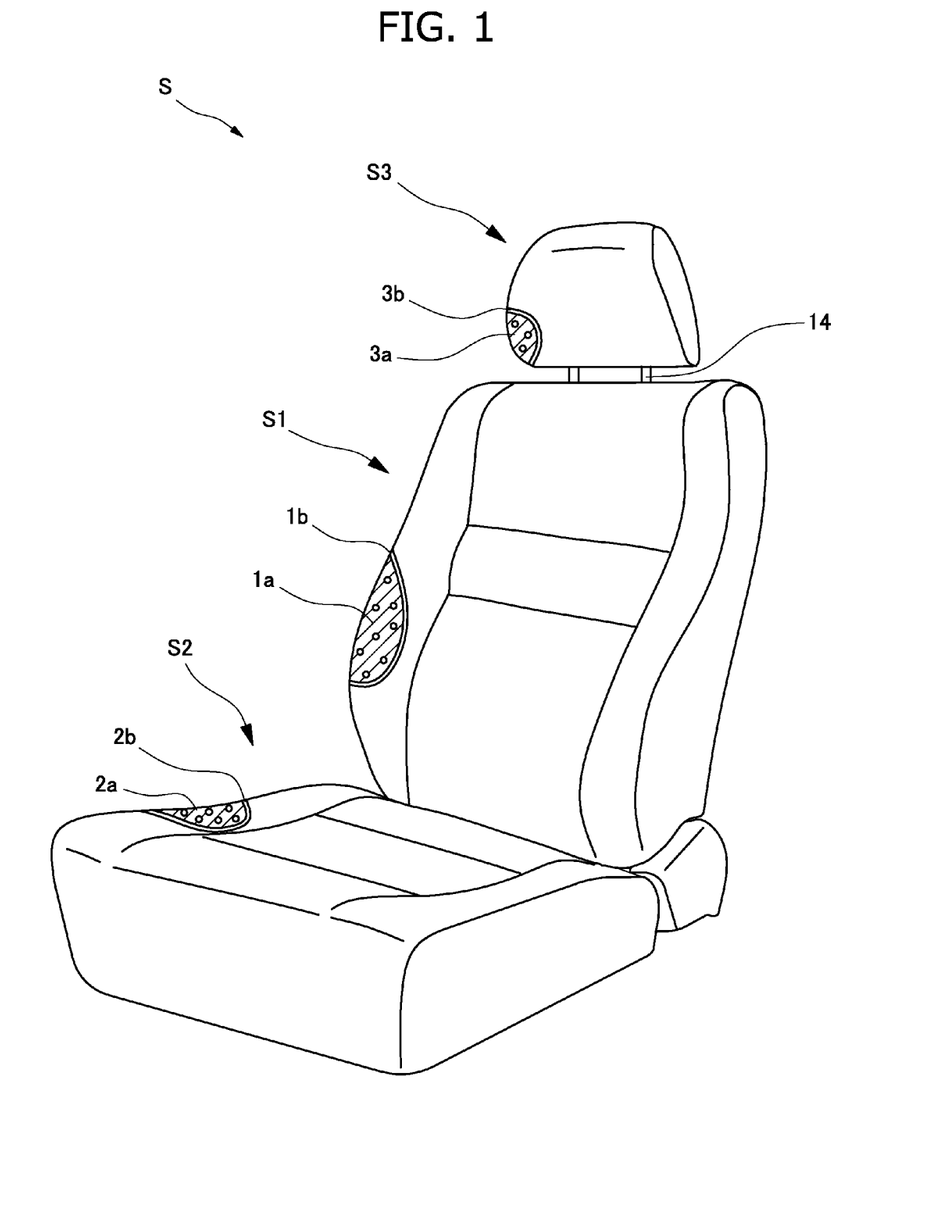
FIG. 1 is an external perspective view of a vehicle seat according to one embodiment of the present invention.

As shown in FIG. 1, a vehicle seat S according to the present embodiment is composed of a seat back S1, a seating portion S2, and a head rest S3, and the seat back S1 and the seating portion S2 are formed by placing cushion pads 1a, 2a on a seat frame (not shown) and covering them with skin materials 1b, 2b. The head rest S3 is formed by arranging a pad material 3a on a core material (not shown) and covering them with a skin material 3b and is supported by a head rest pillar 14.

Figure 2:
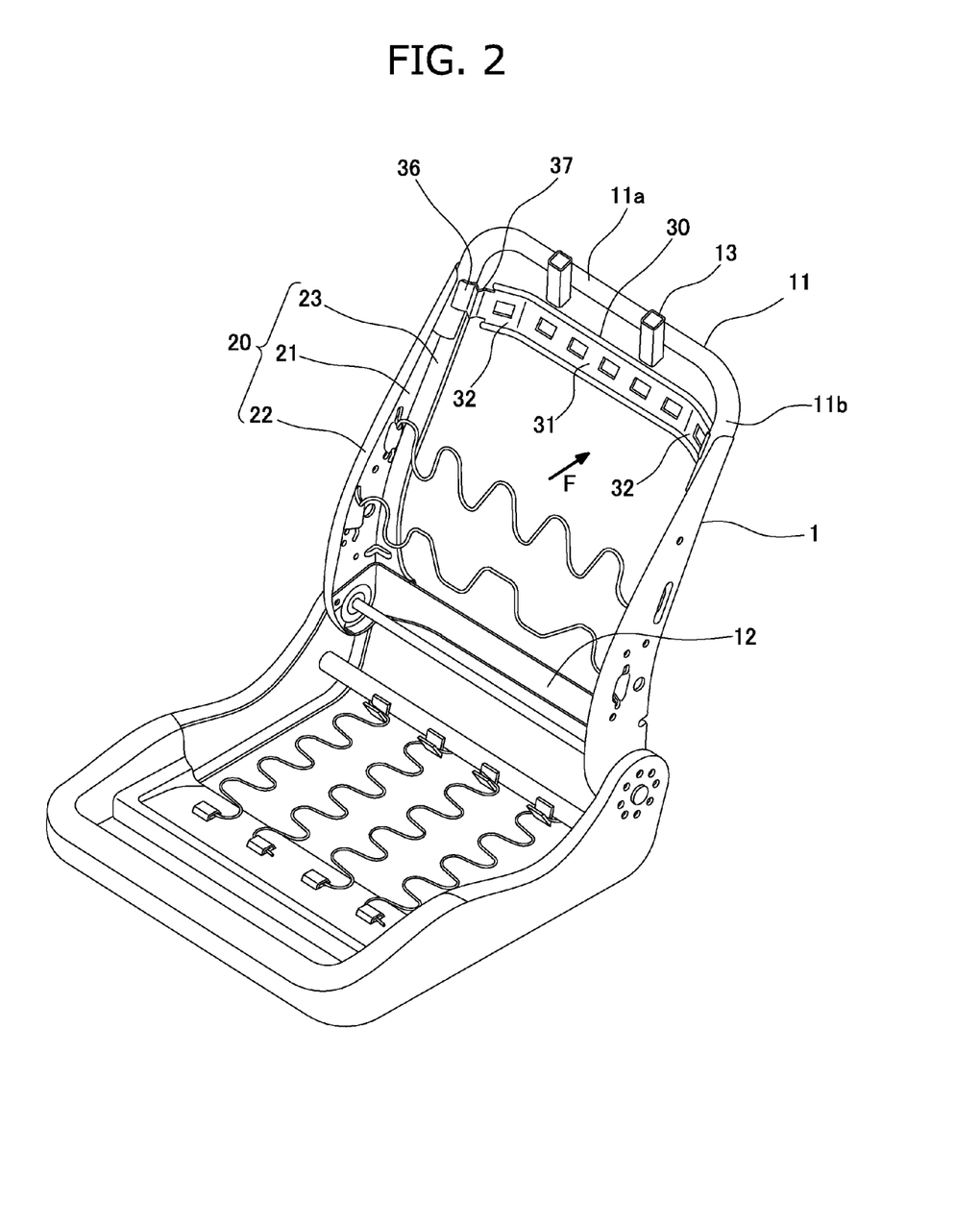
FIG. 2 is an external perspective view of a seat frame of the vehicle seat according to one embodiment of the present invention.

The seat back S1 is formed by placing the cushion pad 1a on a seat back frame 1 and covering them with the skin material 1b from above the cushion pad 1a, and supports the back of an occupant from behind. As shown in FIG. 2, the seat back frame 1 is configured in a frame shape by a pair of side frames 20 arranged to be separated on the right and left and extended in the up and down direction, an upper frame 11 connecting upper end portions of the pair of side frames 20, and a lower frame 12 connecting lower end portions thereof.

The upper frame 11 is composed of a top frame portion 11a extending in the seat width direction and constituting the top portion of the seat back frame 1, and upper frame side portions 11b formed by extending both ends of the top frame portion 11a downwardly while being curved perpendicularly. On the top frame portion 11a of the upper frame 11, pillar support portions 13 for supporting the head rest pillar 14 are provided.

The side frame 20 is formed by pressing a sheet metal, and is formed of an approximate plate body in a substantially D-shape in which a side of the front end is curved and a lower portion of the front end is overhung forwardly. As shown in FIG. 2, the side frame 20 has a substantially flat plate-shaped side portion 21, a front flange portion 22 formed by folding a front end portion of the side portion 21 inwardly into a U-shape, and a rear flange portion 23 formed by bending a rear end portion thereof to the inside of the seat into an L-shape.

As shown in FIG. 2, to a surface of the front inside of the seat of the upper frame side portions 11b on the right and left, a connection frame 30 is welded and fixed.

The connection frame 30 is formed of an approximate plate body of a metallic belt-shape, and includes a back support portion 31 formed into an almost plane in the center of the seat width direction and supporting the back of the occupant, a pair of inclined portions 32 provided on both end sides of the seat width direction of the back support portion 31 and formed of an almost flat surface with an acute angle to the back support portion 31, and narrow portions 35 provided on both end sides of the seat width direction of the pair of inclined portions 32 and narrow in the up and down direction than the back support portion 31 and the inclined portions 32.

The connection frame 30 is curved between the back support portion 31 and the pair of inclined portions 32. The inclined portions 32 support the side of the occupant when the occupant is seated.

Figure 3:
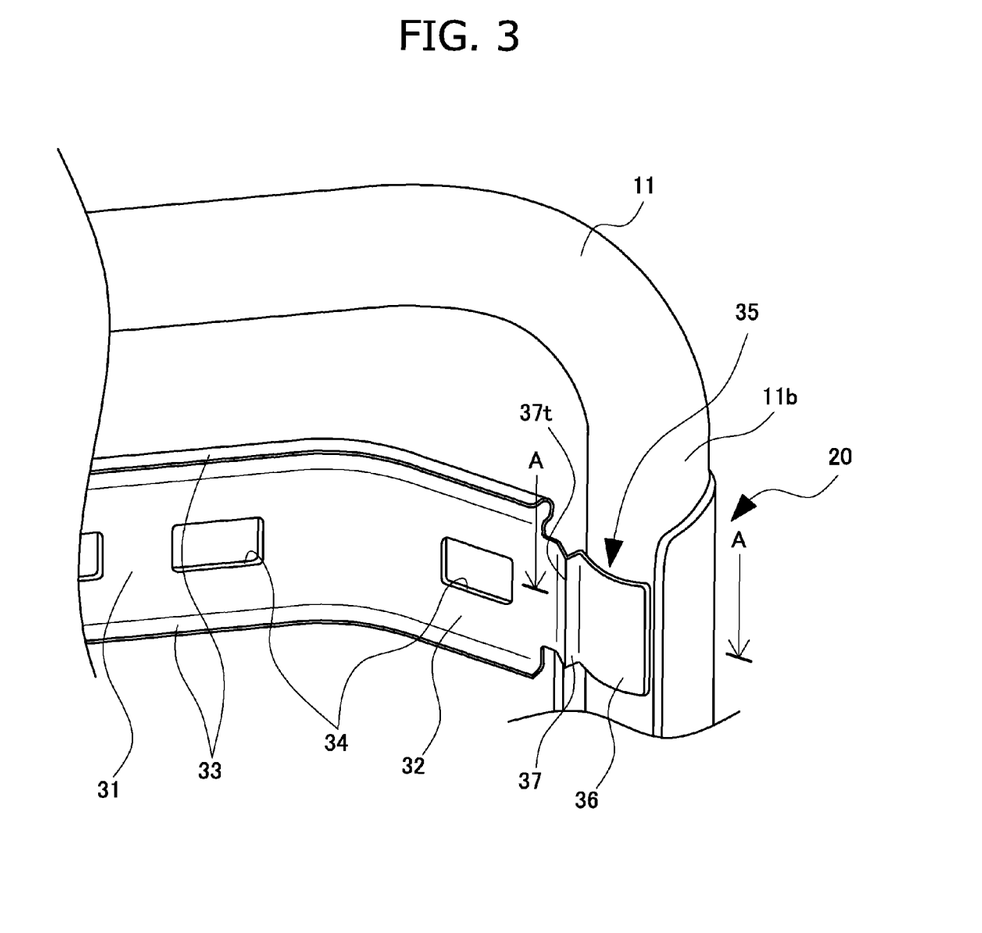
FIG. 3 is a perspective view showing an end portion of a connection frame according to one embodiment of the present invention.

As shown in FIG. 2 and FIG. 3, to the back support portion 31 and the inclined portions 32, flange portions 33 formed by bending their upper ends and lower ends are provided along the extending direction of the back support portion 31 and the inclined portions 32. The back support portion 31 and the inclined portions 32 correspond to the wide portions of the embodiments.

As shown in FIG. 2 and FIG. 3, in the back support portion 31 and the inclined portions 32, a plurality of rectangular openings 34 are provided in the center of the up and down direction. The openings 34 are provided for reducing the weight of the connection frame 30 and for positioning jigs (not shown) used for welding.

The narrow portion 35 is belt-shaped portions narrow in the up and down direction provided on both ends of the connection frame, and includes a connection portion 36 connecting the connection frame 30 to the upper frame side portion 11b, and a bent protrusion portion 37 provided between the connection portion 36 and the inclined portion 32.

The connection portion 36 is provided on the end portion opposite to the inclined portion 32 of the narrow portion 35, and is fixed by welding to the surface of the front inside of the seat of the upper frame side portion 11b. The connection portion 36 may be fixed to a surface of the rear side of the seat of the upper frame side portion 11b as long as sufficient space for bending the connection frame 30 backward is secured in the rear of the upper frame side portion 11b.

The bent protrusion portion 37 is a portion formed by bending the narrow portion 35 into a V-shape in cross section to protrude toward the front inside of the seat. The bent protrusion portion 37 is arranged in a standing condition having about 5 mm height from a surface of the narrow portion 35.

The bent protrusion portion 37 may be formed into a U-shape or a horseshoe-shape in cross section, or may be formed into an S-shape or a Z-shape in cross section by bending it to the front of the seat once to be protruded more forward than the surface formed by the connection portion 36, by bending it in the opposite direction to the rear of the seat to be protruded more backward than the surface formed by the connection portion 36, and again by bending it in the opposite direction to the front of the seat to the surface formed by the connection portion 36.

Moreover, the bent protrusion portion 37 is provided over the entire length of the up and down direction of the narrow portion 35 such that the bent width is substantially the same length. The bent protrusion portion 37 may be formed such that the bent width is larger in the upper portion than in the lower portion.

The bent protrusion portion 37 is provided on a position with a predetermined distance between the opening 34. Although the bent protrusion portion 37 may be wrenched off if the bent protrusion portion 37 and the opening 34 are too close, the bent protrusion portion 37 is provided on the position with a predetermined distance between the opening 34 in the present embodiment so that the rigidity of the bent protrusion portion 37 is secured.

Figure 4:
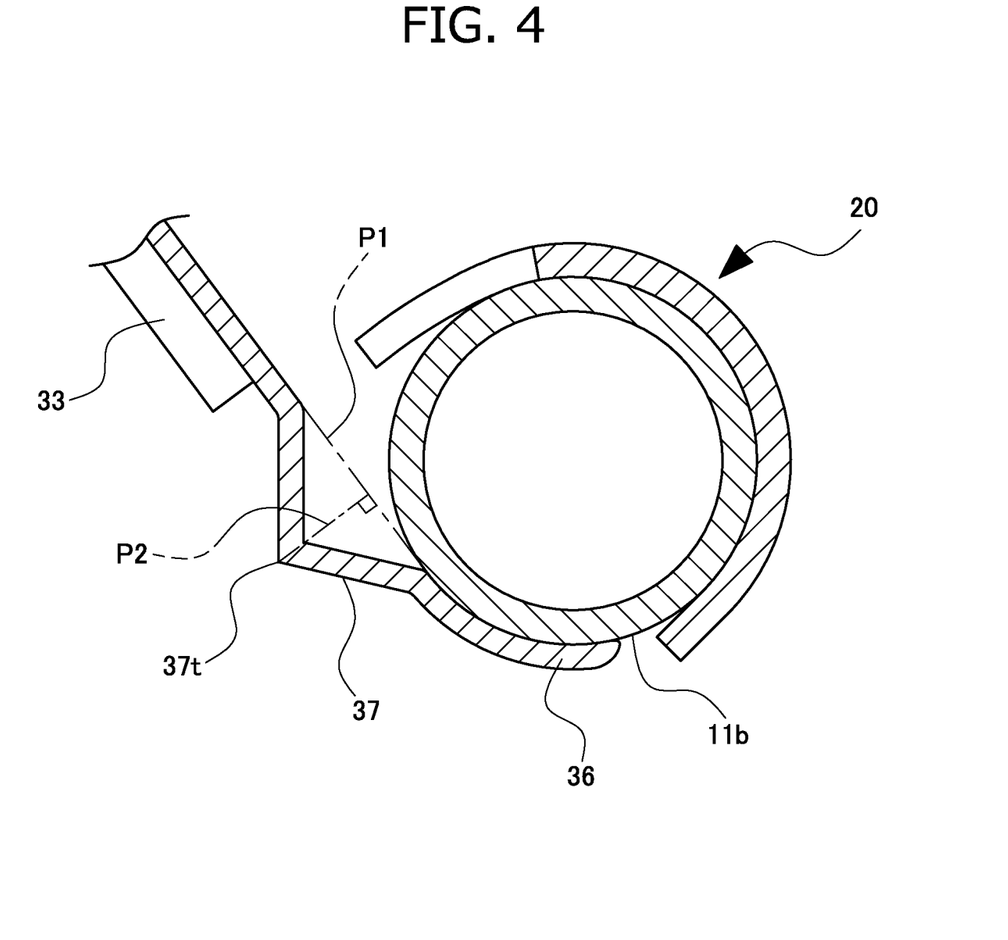
FIG. 4 is an A-A cross-sectional view of FIG. 3.

Moreover, as shown in FIG. 4, the bent protrusion portion 37 is provided to be located on the inside of the seat than the upper frame side portion 11b. A top line 37t of the bent protrusion portion 37 is provided to face the front inside of the seat when viewed from the upper frame side portion 11b side. That is to say, a surface P2 perpendicular to an imaginary surface P1 passing the top line 37t and connecting portions except for the bent protrusion portion 37 of the narrow portion 35 is provided to face the front inside of the seat.

Figure 5:
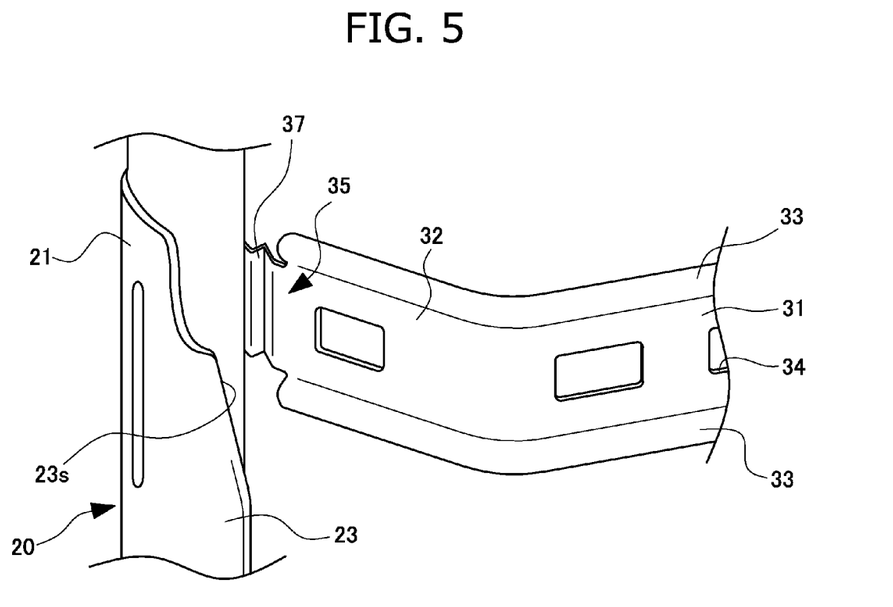
FIG. 5 is a perspective view illustration diagram of a connecting point between the connection frame and an upper frame according to one embodiment of the present invention viewed from the rear of the seat.

FIG. 5 shows a view of the connection portion between the connection frame 30 and the upper frame side portion 11b of FIG. 3 viewed from the rear of the seat.

As shown in FIG. 4 and FIG. 5, the rear flange portion 23 of the side frame 20 includes a notch portion 23s notched obliquely on the upper end of the center side end portion of the seat. By providing the notch portion 23s, even in general use, and even when the bent protrusion portion 37 is extended during a rear-end collision of the vehicle, the connection frame 30 and the rear flange portion 23 do not interfere with each other.

In the present embodiment, in general use, the bent protrusion portion 37 keeps a V-shaped cross sectional form as shown in FIG. 3 and FIG. 4, but in a case where a force pressing the occupant against the seat back S1 is applied in an F direction of FIG. 2 during a rear-end collision of the vehicle, the bent protrusion portion 37 is extended while being deformed to widen the V-shape. Thereby, the connection portion 36 bends backward, the occupant can be allowed to enter to a more rear position than in general use, and the distance between the occupant back surface and the head rest S3 can be reduced. These effects can be achieved by using a simple structure and few component portions.

REFERENCE NUMERALS

P1 Imaginary surface
P2 Surface
S Vehicle seat
S1 Seat back
S2 Seating portion
S3 Head rest
1 Seat back frame
1a, 2a Cushion pad
1b, 2b Skin material
3a Pad material
3b Skin material
11 Upper frame
11a Top frame portion
11b Upper frame side portion
12 Lower frame
13 Pillar support portion
14 Head rest pillar
20 Side frame
21 Side portion
22 Front flange portion
23 Rear flange portion
23s Notch portion
30 Connection frame
31 Back support portion
32 Inclined portion
33 Flange portion
34 Opening
35 Narrow portion
36 Connection portion
37 Bent protrusion portion
37t Top line

The invention claimed is:

1. A seat frame for a vehicle seat, comprising:
a seat back frame comprising:
   a top frame portion on a top of the seat,
   lateral frame portions on right and left sides of the seat,
   a connection frame connecting the tops of the lateral frame portions to bridge them; and
   a pair of support portions for supporting a head rest of the seat;
wherein:
   the connection frame is formed as a plate shaped body, and comprises
      a flange portion formed by bending an end portion of the plate shaped body on at least one of an upper end and a lower end in a central portion of the connection frame in a seat width direction,
      a non-flange portion that is not provided with the flange portion and is located at an end portion of the connection frame in the seat width direction, and
      a bent protrusion portion bent in a longitudinal direction of the connection frame and arranged in a standing condition from a surface formed by the connection frame;
   the bent protrusion portion
      is provided over the entire length of an up and down direction of the connection frame,
      is provided on the non-flange portion,
      protrudes forward and protrudes to a front of the connection frame relative to the non-flange portion, and
      is disposed only outside of a pair of vertical lines, respectively passing through the pair of support portions, in the seat width direction;
   the non-flange portion of the connection frame includes a connection portion fixedly attached to a front side of one of the lateral frame portions; and
   the bent protrusion portion is provided between the flange portion and the connection portion.

2. The seat frame for the vehicle seat according to claim 1, wherein:
   the seat back frame comprises:
      a pair of side frames extending along right and left sides of the seat, and
      an upper frame connecting upper ends of the pair of side frames;
   the upper frame comprises:
      the top frame portion, and
      upper frame side portions which are formed by extending end portions of the top frame portion in the seat width direction downwardly while being curved and to which the side frames are fixed;

the connection portion of the connection frame is a first connection portion;

the connection frame has a second connection portion, the first and second connection portions being respectively located at both ends of the connection frame and fixed to the upper frame side portions, and center side end portions of the connection portions extend backwardly of a center of the seat;

each of the pair of side frames comprises:
 a side wall extending in a front to back direction of the seat, and
 a rear wall provided by bending the rear end of the side wall to the center side of the seat; and in the rear wall, an upper end inside the seat is notched obliquely.

3. The seat frame for the vehicle seat according to claim 1, wherein:
the connection frame comprises:
 wide portions with a large length of the up and down directions, and
 narrow portions with a small length of the up and down direction; and
the bent protrusion portion is provided on the narrow portions.

4. The seat frame for the vehicle seat according to claim 1, wherein:
openings are drilled in the connection frame; and
the bent protrusion portion is provided in a region where the openings are not provided of the connection frame.

5. A vehicle seat, comprising:
a head rest; and
a seat back frame comprising:
 a top frame portion on a top of the seat,
 lateral frame portions on right and left sides of the seat,
 a connection frame connecting the tops of the lateral frame portions to bridge them, and
 a pair of support portions for supporting the head rest;
wherein:
the connection frame is formed as a plate shaped body, and comprises
 a flange portion formed by bending an end portion of the plate shaped body on at least one of an upper end and a lower end in a central portion of the connection frame in a seat width direction,
 a non-flange portion that is not provided with the flange portion and is located at an end portion of the connection frame in the seat width direction, and
 a bent protrusion portion bent in a longitudinal direction of the connection frame and arranged in a standing condition from a surface formed by the connection frame;
the bent protrusion portion
 is provided over the entire length of an up and down direction of the connection frame,
 is provided on the non-flange portion,
 protrudes forward and protrudes to a front of the connection frame relative to the non-flange portion, and
 is disposed only outside of a pair of vertical lines, respectively passing through the pair of support portions, in the seat width direction;
the non-flange portion of the connection frame includes a connection portion fixedly attached to a front side of one of the lateral frame portions; and
the bent protrusion portion is provided between the flange portion and the connection portion.

6. The seat frame for the vehicle seat according to claim 1, wherein:
the seat back frame comprises:
 a pair of side frames extending along right and left sides of the seat, and
 an upper frame connecting upper ends of the pair of side frames;
the upper frame comprises:
 the top frame portion, and
 upper frame side portions which are formed by extending the end portion of the seat width direction of the top frame portion downwardly while being curved and to which the side frames are fixed; and
a frontmost part of the bent protrusion portion overlaps with the upper frame side portions in a side view.

7. The seat frame for the vehicle seat according to claim 1, wherein:
the seat back frame comprises:
 a pair of side frames extending along right and left sides of the seat, and
 an upper frame connecting upper ends of the pair of side frames;
the upper frame comprises:
 the top frame portion, and
 upper frame side portions which are formed by extending the end portion of the seat width direction of the top frame portion downwardly while being curved and to which the side frames are fixed; and
a frontmost part of the bent protrusion portion is disposed on an inner side of the seat in the seat width direction relative to a central portion in the seat width direction of one of the upper frame side portions.

8. The seat frame for the vehicle seat according to claim 1, wherein:
a frontmost part of the bent protrusion portion protrudes to the front of the connection frame relative to the non-flange portion.

9. The seat frame for the vehicle seat according to claim 1, wherein:
the connection frame comprises a curved portion that is curved forward, the curved portion being a different portion than the bent protrusion portion, and
the bent protrusion portion is disposed on an outer side of the seat in the seat width direction relative to the curved portion.

* * * * *

UNITED STATES PATENT AND TRADEMARK OFFICE
CERTIFICATE OF CORRECTION

PATENT NO. : 9,725,021 B2  
APPLICATION NO. : 14/425179  
DATED : August 8, 2017  
INVENTOR(S) : Satoshi Fujita and Hiroyuki Itoi It is certified that error appears in the above-identified patent and that said Letters Patent is hereby corrected as shown below:

In the Claims

In Claim 3, Column 9, Lines 21-22, replace "up and down directions" with -- up and down direction --

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*